United States Patent [19]

Deters

[11] 3,952,218

[45] Apr. 20, 1976

[54] GROUNDED ELECTRICAL CONNECTOR FOR SUBMERSIBLE APPARATUS

[75] Inventor: Elmer M. Deters, Muscatine, Iowa

[73] Assignee: Weil-McLain Co., Inc., Dallas, Tex.

[22] Filed: Oct. 29, 1974

[21] Appl. No.: 518,620

[52] U.S. Cl. .............................. 310/71; 339/14 P; 339/60 R; 310/87
[51] Int. Cl.² ........................................ H02K 11/00
[58] Field of Search ................ 310/71, 86, 87, 88, 310/89; 103/87; 417/422; 166/106, .5, .6; 336/107, 192; 339/14, 14 P, 59, 60, 205

[56] References Cited
UNITED STATES PATENTS

| | | | |
|---|---|---|---|
| 3,172,572 | 3/1965 | Brown | 417/422 |
| 3,294,993 | 12/1966 | Komor | 310/71 |
| 3,457,866 | 7/1969 | Komor | 310/87 |
| 3,555,319 | 3/1969 | Schaefer | 310/71 |
| 3,604,964 | 9/1971 | Conrad | 310/71 |
| 3,723,942 | 3/1973 | Dennison | 339/14 |
| 3,736,548 | 5/1973 | Double | 310/71 |
| 3,795,883 | 3/1974 | Ackerman | 339/14 P |
| 3,842,298 | 10/1974 | Schaefer | 310/71 |

*Primary Examiner*—R. Skudy
*Attorney, Agent, or Firm*—Lane, Aitken, Dunner & Ziems

[57] ABSTRACT

An insulating, resilient plug body having a forward portion of reduced diameter is sealingly received in a stepped hole of similar dimensions formed in a submersible housing. A plurality of spaced electrical conductors extend through the sealed interior of the plug. A pregrounding strip is carried on the surface of the forward portion of the plug and extends axially back through the larger rearward portion of the plug body and ends in an integral ground wire terminal behind the plug body. As the plug body is inserted into the hole, the grounding strip is wedged into contact with the wall of the hole, thus making electrical contact with the housing via the wall itself or an electrical terminal on the wall before the power connections are made. The electrical connector is preferably designed for a submersible pump motor, and the inner portion of the hole for the connector is formed through a sealed stator.

13 Claims, 5 Drawing Figures

GROUNDED ELECTRICAL CONNECTOR FOR SUBMERSIBLE APPARATUS

BACKGROUND OF THE INVENTION

The invention relates generally to the field of electrical connectors with grounding means, and more particularly to grounded fluid-tight connectors for sealed submersible bodies, specifically submersible motors.

In ordinary submersible pump motor apparatus, for example, the type used in water wells, the stator shell or housing forms a fluid-tight seal around the stator winding and the rotor of the motor. An opening is formed through the stator shell through which electrical power supply wires running to a remote source of power are interconnected with the stator windings. A specially designed electrical connector assembly is used for this purpose, as shown for instance in U.S. Pat. No. 3,294,993 to P. S. Komor et al. Besides making electrical contact between the respective wires outside and inside of the stator shell, the connector assembly has two other functions: to seal the opening to the interior of the motor, and to seal the electrical connections themselves (i.e. the points of contact) in the connector assembly from the surrounding fluid.

In response to growing considerations of safety in general and the danger of high voltage transients, like lightning, in particular, many industries, such as the water well pump industry, have been finding it necessary to provide additional grounding terminals on their own standard electrical connectors. Ordinarily, this might entail expensive redesign of the connector to maintain the same dielectric strength between the conductors, for example. This redesign would be further complicated by the necessity of maintaining a fluid-tight seal.

SUMMARY OF THE INVENTION

The general approach and objective of the invention is to place a ground terminal in a standard plug assembly for submersible apparatus while maintaining the existing dielectric strength between the original conductors in the connector assembly and forming a sealed contact or connection between the ground terminals without interfering with the fluid-tight seal-ability of the electrical connector. According to the invention, a grounding strip is mounted on the surface of a plug-type connector which, while not affecting the dielectric strength between the other conductors carried within the connector and avoiding interference with the sealing mechanism of the connector assembly, provides an effective preground of the apparatus before power can be applied.

In the preferred embodiment an insulating, resilient plug body having a forward portion of reduced diameter is sealingly received in a stepped hole or opening of similar dimensions formed in a submersible housing. A plurality of radially spaced electrical conductors extend axially through the sealed interior of the plug. An outwardly bowed electrical grounding strip is carried on the surface of the forward portion of the plug body. The strip extends axially back through the interior of the larger rearward portion of the plug body and terminates behind the rearward portion in a ground wire terminal preferably formed by a loop in the end of the strip. Thus the grounding contact and the ground wire terminal are formed by the same integral element. As the plug body is inserted into the hole, the grounding strip is urged into sealed contact with the wall of the hole thus making direct pregrounding electrical contact with the housing via the wall or with a suitable terminal formed on the wall before the power electrical connections are made. The plug body seals the hole when pressure is applied to the back of the rearward portion of the plug which is seated in the conforming portion of the hole.

In the preferred application, the submersible housing is formed by the sealed stator assembly of a submersible pump motor in combination with a pump-motor coupling base having a disc-shaped end member adjacent to the pump motor and a fluid inlet for the pump. Near the radial extremity of the base end member, an axial bore is formed in registry with a coaxial bore of reduced diameter in the stator. The bore in the end member forms the portion of the hole which receives the larger rearward portion of the plug body. The smaller forward portion of the plug body is received in the smaller bore in the stator where contact is made with the wall of the bore in the stator by means of the grounding strip as described. Conventionally, the three wire conductor connections are formed with a pin and socket arrangement in which, as shown in the above-mentioned patent to Komor et al, recessed tubular sockets are carried within the plug body and mating electrically conductive pins are formed on a separate body permanently inserted through an inner coaxial bore of further reduced diameter in the stator.

DESCRIPTION OF THE PREFERRED EMBODIMENT

Figure 1:
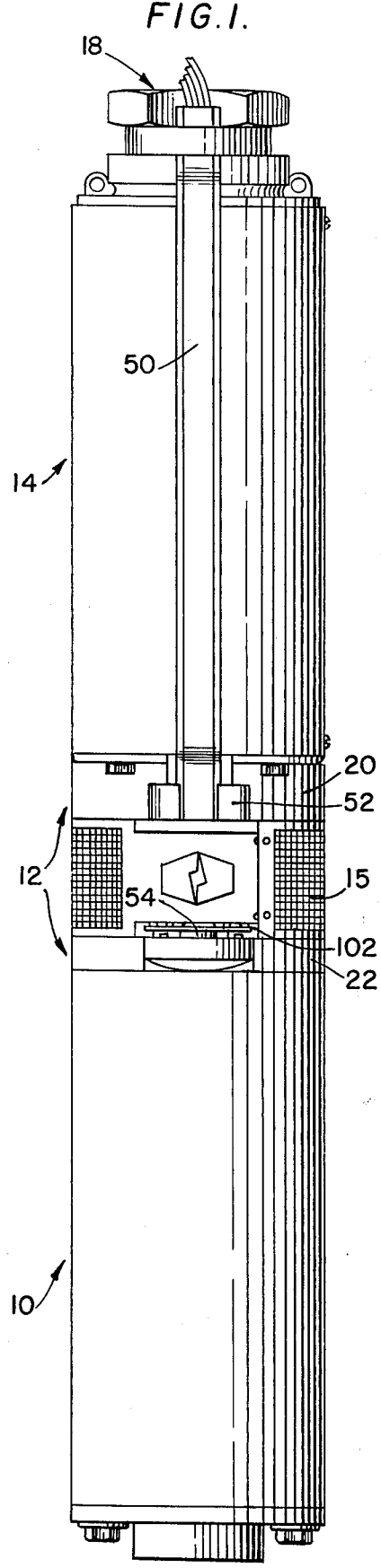
FIG. 1 is a side view of a submersible pump unit in elevation.
Figure 2:
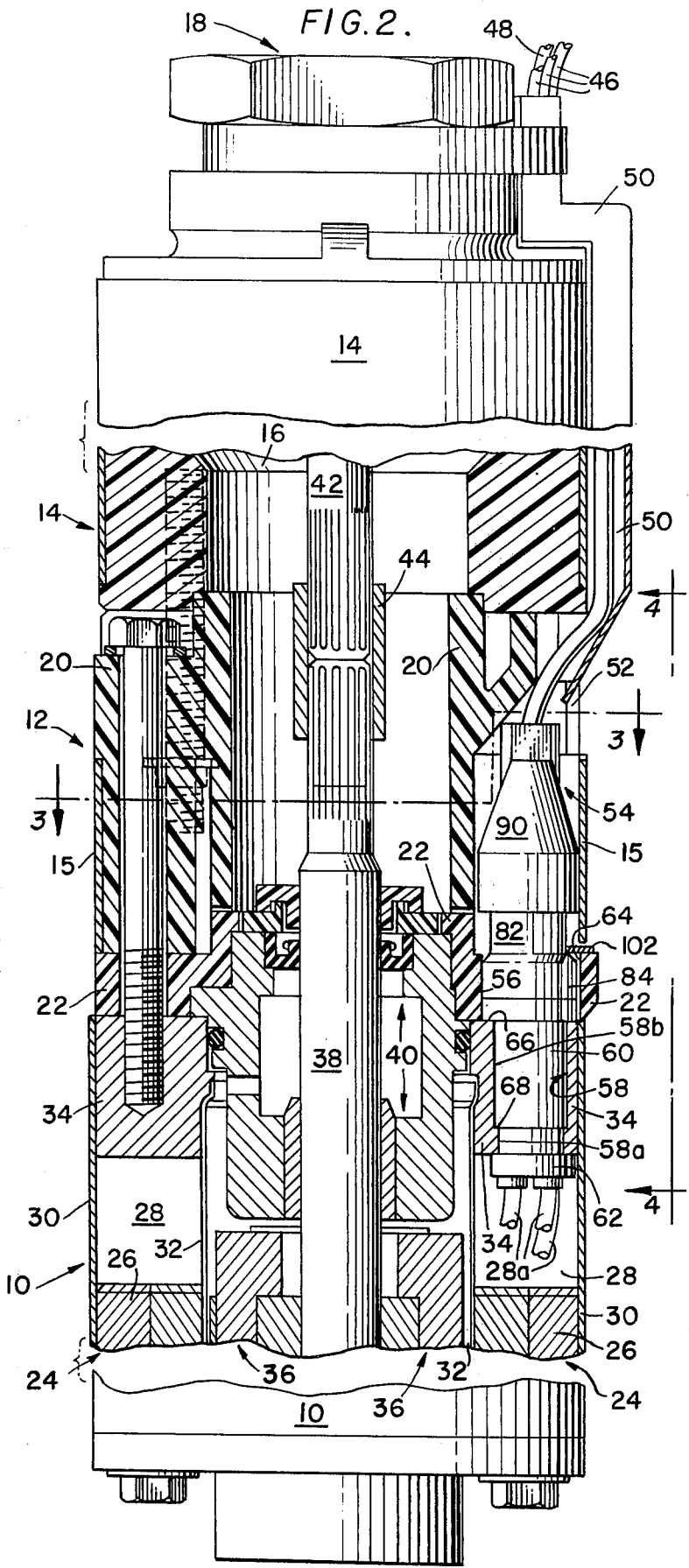
FIG. 2 is an enlarged sectional view of the unit taken along the lines 2—2 of FIG. 3 with portions in elevation.

The electrical connector assembly described herein is specifically designed for use with a submersible pump motor 10 connected by means of pump-motor base 12 in line with a multistage centrifugal fluid pump 14, as shown in FIG. 1. The elongated shape of the pump and motor assembly is to permit insertion in a cylindrical well casing with adequate clearance (not shown). As shown in FIG. 2, water or other fluid is sucked through a removable strainer 15 strapped around openings in the base 12 and then through an axial pump inlet 16. After passing through the pump 14, the fluid is exhausted through the axial pump outlet 18 to a drop pipe or delivery pipe (not shown) which rises through the well casing to the surface. The base 12 includes an upper portion 20 which is bolted to the bottom part of the pump 14. At the other end of the base 12, a base end plate 22 is affixed or clamped to the motor 10 by means of long cap screws extending through the upper portion 20 and base plate 22 into the motor housing.

The motor 10 has a stator assembly 24 including the stator core 26 and stator windings 28 (not shown). The stator assembly is sealed in an annular enclosure formed by a cylindrical outer shell 30, a coaxial, cylindrical inner liner 32 and steel end rings 34 (one shown in FIG. 1) to close the open ends of the annular volume in which the stator core and windings 26 and 28 reside. The interior of the stator assembly 24 occupied by windings 28 is normally potted in a filling and insulating material.

The rotor portion 36 is disposed coaxially within the stator assembly 24 and includes electrical elements (not shown) to cooperate with the stator in driving a rotor shaft 38. The output end of the shaft 38 extends through a sealed bearing assembly 40 flanged to be mounted and retained on the stator end ring 34 by means of the base 12. The output end of the rotor shaft 38 terminates within the base 12 in abutting alignment with a pump shaft 42 connected to centrifugal pump elements (not shown) operative to pump fluid between the inlet 16 and outlet 18. The splined ends of the rotor shaft 38 and pump shaft 42 are drivingly connected by a sleeve coupling 44.

Power is furnished to the pump motor 10 via three power wires 46. A fourth wire 48, not commonly found in conventional pump units today, serves as a safety ground wire. While the embodiment described herein relates to three-wire motors, it will be appreciated that the invention is equally applicable to conventional two-wire motors with which the safety ground wire would represent a third wire. The wires 46 and 48 extend from the surface downwardly in the space between the drop pipe and the inner wall of the well casing (not shown), alongside the pump 14 through a cable guard 50 affixed to the outside of the pump, through cable guard retainer 52 in the base 12, and finally to a grounded electrical connector assembly 54, which is received in aligned stepped openings or bores 56 and 58 formed near the radial extremity of the base plate 22 and the stator ring 34 in order to provide electrical interconnection between the wires 46 and the leads 28a for the stator windings 28 as well as for providing an independent ground via wire 48 for the motor 10.

Figure 3:
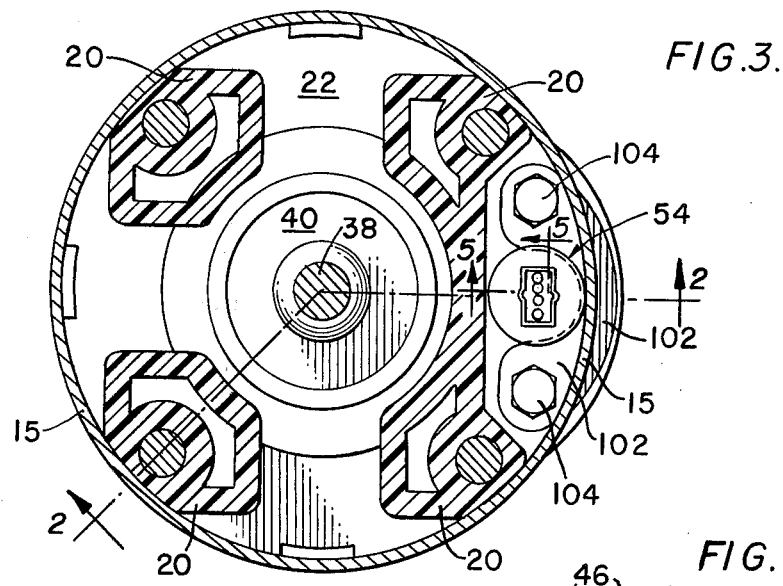
FIG. 3 is a detail sectional view taken through the pump-motor base along lines 3—3 of FIG. 2 illustrating the connector assembly in plan.
Figure 4:
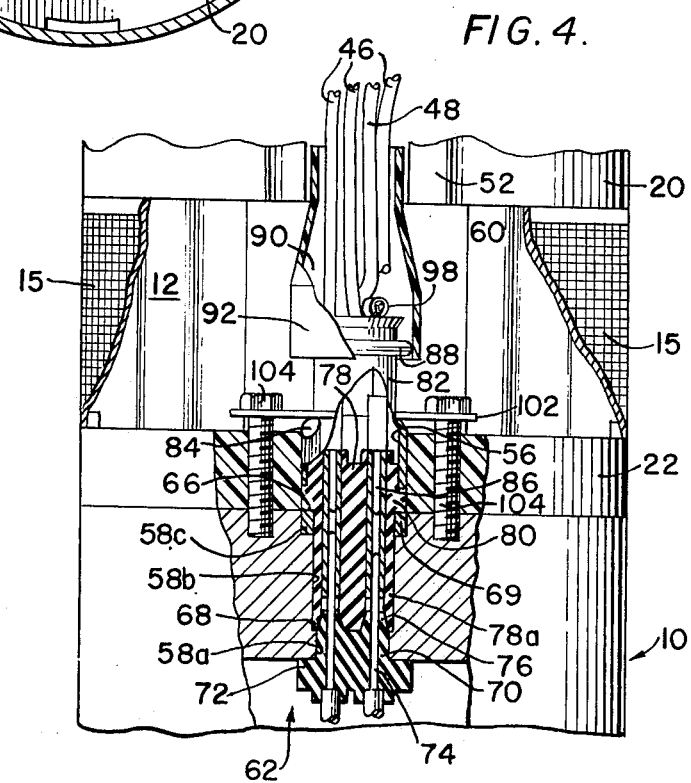
FIG. 4 is a detail side view along lines 4—4 of FIG. 2. with portions broken away to show the connector assembly in elevation.
Figure 5:
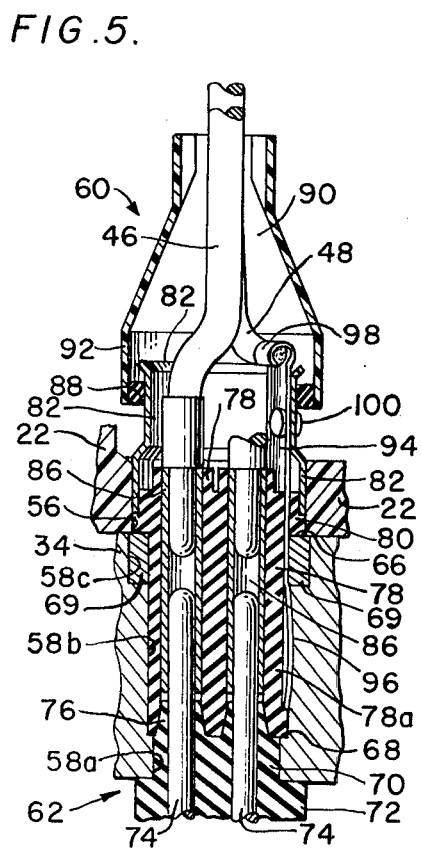
FIG. 5 is a detail sectional view of the connector assembly taken along lines 5—5 of FIG. 3 to illustrate the grounding strip in particular.

As shown in detail in FIGS. 3–5, the connector assembly 54, a plug-in type disconnect, divides into two elements; namely, a female socket portion 60 to which the ends of the wires 46 and 48 are connected and which is detachable from the stator assembly 24, and a male pin portion 62 to which the stator winding leads 28a are attached, permanently mounted inside the stator assembly.

The bores 56 and 58 are cylindrical and coaxial with the exception of a keyway 64 formed as a groove in the wall of the bore 56 in the base plate 22. Otherwise, the diameter of the bore 56 is uniform and larger than the diameter of the bore 58 through the stator ring 34. The bore 58 is actually a composite bore having a smaller bore 58a of least diameter opening into the sealed interior of the stator assembly 24 and a portion 58b of intermediate diameter resembling a counterbore. Together the aligned coaxial bores 56, 58a and 58b form a passageway to the interior of the stator assembly having a non-uniform diameter which reduces in three steps forming first and second annular shoulder-like surfaces 66 and 68 therebetween.

If desired, because of oxidation of the steel ring 34, a brass contact ring 69 may be pressfit in another counterbore 58c as shown in FIGS. 4 and 5. The ring 69 should have dimensions equal to the difference between the diameters of the counterbores 58b and 58c. Alternatively, the inside of the bore 58b in the ring 34 may be plated with a corrosion-resistant, electrically conductive material.

The pin-bearing male connector element 62, as shown in FIG. 4, is sealed in the interior of the stator assembly 24 and comprises a cylindrical plug body 70 of insulating, resilient material, such as rubber, with a headed end portion 72. The insertable shank portion is slightly longer than the axial length of the innermost bore 58a into which it is tightly pressfitted. The headed end 72 seats against the underside of the ring 34. Three radially spaced axial pins 74 are embedded in the plug body, preferably after insertion in the bore 58a, and the ends of the pins protrude from the face of the plug body through short bosses 76 integral with the plug body 70 into the intermediate counterbore 58b. The pins 74 have ferrule ends in the headed end 72. The ferrules are crimped or soldered to the respective bared stator lead wires 28a inside the stator assembly 24. The plug body 70 is permanently sealed in the bore 58a when the potting material in the interior of the stator assembly 24 solidifies around the stator windings 28 (not shown).

The removable female element 60 includes an elongated generally cylindrical plug body 78 of resilient, dielectric material, preferably rubber, contoured and dimensioned to be received in the stepped socket formed by the bore 56 through the base plate 22 and the intermediate counterbore 58b in the ring 34. The plug body 78 has a forward end portion 78a of similar length and diameter to the intermediate counterbore 58b. Behind the end portion 78a the plug body 78 has a short radial flange 80 with a greater diameter corresponding to that of the bore 56. Immediately behind the flange 80, the plug body 78 reduces to a smaller diameter which receives a rigid metal sleeve 82 having an outer diameter which approximates that of the bore 56 and a ridged portion or key 84 which fits into the keyway 64 in the bore 56. The female plug body 78 is also keyed to the sleeve 82 so that registration of the plug body in the bores 56 and 58b is properly determined.

Three axial tubular sockets 86 are radially spaced in the plug body 78 corresponding to the pins 74 in the male element 62. The open ends of the sockets 86 are recessed slightly from the face of the end portion 78a. Countersinks are formed coaxially with the respective sockets 86 in the end face of the plug body to mate with the bosses 76 on the male plug body 70. The bare ends of the three power wires 46 are crimped or soldered into electrical connection with respective top pins inserted in the sockets 86 behind the plug body 78.

The metal sleeve 82 has an intermediate sloping annular shoulder leading to a necked-down portion terminated by a flared opening through which the wires 46 and 48 freely pass. A rubber O-ring 88 is fitted over the necked-down portion of the metal sleeve 82. A bell-shaped plastic canopy or shell 90 has a cylindrical end 92 which is fitted over the O-ring 88. The opposite end of the plastic shell 90 is rectangular or oval at the top to hold the wires 46 and 48 in a planar configuration to permit conformation and placement into the cable guard 50 (FIG. 2) above the connector assembly 54. In practice, the interior of the sleeve 82 and shell 90 is potted with a filling and insulating material to seal the electrical connections behind the plug body 78.

A fourth electrical contact, the primary subject of this application, is formed by a flat grounding strip 94 of electrically conductive resilient material such as beryllium copper, as shown in detail in FIG. 5. The strip 94 has a bowed portion 96 at one end and terminates at the other end with a loop 98 in which the bared end of the ground wire 48 is soldered or crimped. The grounding strip 94 extends approximately parallel to the cylindrical axis of the removable plug body 78 and is arranged therein at a radial spacing such that the outer surface of the strip 94 is approximately flush with the outer cylindrical surface of the end portion 78a of the plug body. For this purpose, the surface of the end portion 78a of the plug body has a planed portion forming a flat area in which the grounding strip can lie extending from just above the end face of the end portion 78a up to the flange 80. At that point, the grounding strip 94 extends axially into and through the flange 80 and protrudes from the upper end face of the plug body 78. The upper portion of the grounding strip 94, just below the loop 98, comes into contact with the inner wall of the necked-down portion of the metal sleeve 82. Below the O-ring 88 a rivet 100 secures the grounding strip 94 to the metal sleeve 82.

As shown in FIGS. 3 and 4 a flat C-shaped tension strap 102 fits around the necked-down portion of the metal sleeve 82 in abutment with its shoulder. The apertured ends of the tension strap are bolted against the outer surface of the base plate 22 by means of clamping bolts 104 received in threaded bores in the stator ring 34. FIG. 4 shows the strap 102 before final tightening.

In use, the female socket element 60 is inserted into the keyed opening formed by the bore 56 and pushed into place such that the flange 80 seats against the shoulder 66 and the end face of the inner end portion 78a seats against the directly opposing face of the male plug body 70. Because the brass contact ring 69 is located at the upper end of the bore 58b well above the pins 74, as the plug body 78 is inserted, the grounding strip 94 makes electrical contact with the brass ring 69 before the pins 74 touch the respective sockets 86 in the plug body 78. Thus, the desired pregrounding of the motor is effected before power can be applied.

After the pins 74 are received in the sockets 86, the tension strap 102 is clamped in place. As explained in the U.S. Pat. No. 3,294,993 to Komor et al, tightening the clamping bolts 104 applies downward force to the metal sleeve which is transmitted to the resilient removable plug body 78. The downward force axially compresses the resilient plug body 78 expanding the outer surfaces thereof into sealing engagement with the walls of the bores 56 and 58b. In particular, the expansion of the flange 80 seated in abutment with the shoulder 66 causes an effective fluid-tight seal at the opening to the stator ring 34. Moreover, the tension strap applies continual pressure to the female plug body 78 to accommodate dimensional changes due to "cold flow" and thermal expansion or contraction.

There are several advantages to the configuration described above in which the original arrangement of the three power wire connectors (pins 74 and sockets 86) is undisturbed and the ground contact is made at the surface of the removable plug body 78. Specifically, the dielectric strength between the respective power connectors is maintained. Because the grounding strip 94 runs through the interior of the flange 80, the seal provided by the flange's engagement with the shoulder 66 and adjacent inner wall of the bore 56 is not lessened. Hence, a positively sealed ground contact is formed even though the ground contact is not formed in the interior of the plug body 78 as are the other three (or two) electrical connections. Moreover, the grounding strip 94 integrally provides the grounding contact as well as the ground wire terminal.

Many variations, modifications and different applications of the above-described grounded submersible connector assembly are feasible without departing from the basic principles disclosed above. The present embodiment is, therefore, to be considered in all respects as illustrative and not restrictive, the scope of the invention being indicated by the claims rather than by the foregoing description; and all changes which come within the meaning and range of the equivalents of the claims are therefore intended to be embraced therein.

I claim:

1. A grounded electrical connector assembly for a submersible body, comprising submersible electrical apparatus having a sealable housing, an electrically insulating resilient plug body having a forward cylindrical portion of reduced diameter, a stepped hole of similar dimensions formed in said housing for receiving said plug body, a plurality of radially spaced electrical conductors extending axially through the sealed interior of said plug body, and an outwardly bowed electrical grounding strip carried on the cylindrical surface of said forward portion of said plug and extending axially back through the interior of the larger rearward portion of the plug body so as to avoid interfering with the seal provided by seating of the rearward portion of the plug in the conforming portion of the hole in said housing, and contacting terminal means on the side wall of said hole adjacent the bowed portion of said grounding strip, such that when said plug body is inserted into said hole, said grounding strip is urged into sealed physical contact with said terminal means on said side wall of said hole to establish electrical connection therewith.

2. The connector assembly of claim 1, wherein said submersible electrical apparatus is an electric motor having a stator assembly enclosure.

3. The connector assembly of claim 2, wherein said housing having said hole is at least partly formed by a portion of said stator assembly enclosure.

4. The connector assembly of claim 2, wherein said housing includes a mounting member affixed to a portion of said stator assembly enclosure, said hole being defined by a bore through said mounting member in alignment with another bore of reduced diameter corresponding to the forward portion of said plug body formed in said stator enclosure.

5. The connector assembly of claim 4, wherein the bore in said stator enclosure is counterbored at the interface with the mounting member to receive a press-fitted ring of electrically conductive material forming said electrical contact means in the wall of said hole.

6. The connector assembly of claim 1, wherein said grounding strip is made of beryllium copper.

7. The connector assembly of claim 1, wherein said plug body is made of an elastomeric material.

8. The connector assembly of claim 1, wherein said terminal means on the wall of said hole is a plating of corrosion-resistant electrically conductive material.

9. The connector assembly of claim 1, wherein said terminal means on the wall of said hole is located such that said housing is pregrounded by said grounding strip as said plug body is inserted into said hole before contact is made with said electrical conductors.

10. A grounded electrical connector assembly for a submersible body, comprising submersible electrical apparatus having a sealable housing, an electrically insulating resilient plug body having a forward portion of reduced diameter, a stepped hole of similar dimensions formed in said housing for receiving said plug body, a plurality of radially spaced electrical conductors extending axially through the sealed interior of plug body, and an outwardly bowed electrical grounding strip carried on the surface of said forward portion of said plug and extending axially back through the interior of the larger rearward portion of the plug body so as to avoid interfering with the seal provided by seating of the rearward portion of the plug in the conforming portion of the hole in said housing, contacting terminal means on the wall of said hole adjacent the bowed portion of said grounding strip, such that when said plug body is inserted into said hole, said grounding strip is urged into sealed physical contact with said terminal means on said wall of said hole to establish electrical connection therewith, a keyway being formed in said wall of said hole and a keyed metal sleeve surrounding the rearward end of the plug body, said grounding strip being affixed to the inside of said sleeve and terminating immediately above the end of said sleeve in an electrical grounding terminal.

11. The connector assembly of claim 10, wherein said metal sleeve has a necked-down intermediate axial portion forming an abutment, spring means engaging said abutment of said sleeve for urging said plug body toward said housing, and bolt means for securing said spring means to said housing.

12. The connector assembly of claim 11, wherein said terminal is in the shape of a loop formed by an extension of said strip.

13. The connector assembly of claim 11, wherein said sleeve has a necked-down intermediate axial portion forming an abutment, means detachably connected to said housing adjacent said hole for applying continual axial pressure to said plug body at said abutment of said sleeve, O-ring means for providing a fluid-tight seal fitted around said intermediate portion of said sleeve, an outer shell having one end fitted over said O-ring means and the opposite end extending rearwards of said plug body, and potting material filling the interior of said sleeve and said shell.

* * * * *